US010805780B1

(12) United States Patent
Indurkar

(10) Patent No.: US 10,805,780 B1
(45) Date of Patent: Oct. 13, 2020

(54) MOBILE PHONE DIFFERENTIATED USER SET-UP

(71) Applicant: Sprint Communications Company L.P., Overland Park, KS (US)

(72) Inventor: Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/370,880

(22) Filed: Mar. 29, 2019

Related U.S. Application Data

(62) Division of application No. 15/584,001, filed on May 1, 2017, now Pat. No. 10,306,433.

(51) Int. Cl.
*H04W 4/50* (2018.01)
*H04W 12/08* (2009.01)
*H04M 1/2757* (2020.01)

(52) U.S. Cl.
CPC .......... *H04W 4/50* (2018.02); *H04M 1/2757* (2020.01); *H04W 12/08* (2013.01)

(58) Field of Classification Search
CPC ...... H04W 4/50; H04W 12/08; H04M 1/2757
See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 6,889,040 B1 | 5/2005 | Koo et al. | |
| 6,963,908 B1* | 11/2005 | Lynch | G06F 9/44505 709/220 |
| 7,027,773 B1 | 4/2006 | McMillin | |
| 7,165,191 B1 | 1/2007 | Vakrat | |
| 7,260,382 B1 | 8/2007 | Lamb et al. | |

(Continued)

FOREIGN PATENT DOCUMENTS

DE    112016000711 T5    11/2017
EP        2079256 A1     7/2009

(Continued)

OTHER PUBLICATIONS

Google Scholar Search Results.*

(Continued)

*Primary Examiner* — Qun Shen

(57) ABSTRACT

A method of configuring user settings on a mobile communication device. The method comprises sending a message by a software service layer of a mobile communication device to a first computer system to request an identity of a second computer system from which to obtain user settings configuration instructions, receiving a response message by the software service layer from the first computer system, wherein the response message comprises the identity of the second computer system, sending a user settings request message by the software service layer to the second computer system, receiving a user settings response message by the software service layer from the second computer system, and configuring user settings on the mobile communication device by the software service layer by executing instructions received in the user settings response message.

14 Claims, 8 Drawing Sheets

(56) References Cited

U.S. PATENT DOCUMENTS

| | | |
|---|---|---|
| 7,266,371 B1 | 9/2007 | Amin et al. |
| 7,409,208 B1 | 8/2008 | Clare et al. |
| 7,493,111 B2 | 2/2009 | Knowles |
| 7,530,079 B2 | 5/2009 | Stubbs et al. |
| 7,817,988 B2 | 10/2010 | Kruis et al. |
| 7,904,895 B1 | 3/2011 | Cassapakis et al. |
| 7,991,988 B2 | 8/2011 | Chen |
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,468,164 B1 | 6/2013 | Paleja et al. |
| 8,522,343 B2 | 8/2013 | Hernacki |
| 8,571,536 B2 | 10/2013 | Urbanek |
| 8,612,967 B1 | 12/2013 | Delker |
| 8,626,165 B1 | 1/2014 | Narasimhan et al. |
| 8,639,245 B2 | 1/2014 | Shi et al. |
| 8,666,383 B1 | 3/2014 | Mauer et al. |
| 8,699,377 B2 | 4/2014 | Veillette |
| 8,819,188 B2 | 8/2014 | Blatherwick et al. |
| 8,825,039 B2 | 9/2014 | Mizuguchi |
| 8,855,012 B1 | 10/2014 | Sun |
| 8,909,211 B2 | 12/2014 | Huq et al. |
| 8,909,291 B1 | 12/2014 | Spanel et al. |
| 8,938,436 B2 | 1/2015 | Kozempel |
| 8,965,366 B1 | 2/2015 | Somayajula et al. |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,124,719 B2 | 9/2015 | Inlow et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,304,668 B2 | 4/2016 | Rezende et al. |
| 9,307,400 B1 | 4/2016 | Blinn et al. |
| 9,313,643 B1 | 4/2016 | Ghoshal et al. |
| 9,319,270 B2 | 4/2016 | Bestmann et al. |
| 9,357,378 B1 | 5/2016 | Delker et al. |
| 9,363,622 B1 | 6/2016 | Ahn et al. |
| 9,392,395 B1 | 7/2016 | Indurkar |
| 9,398,462 B1 | 7/2016 | Delker et al. |
| 9,420,399 B2 | 8/2016 | Urbanek |
| 9,420,496 B1 | 8/2016 | Indurkar |
| 9,426,641 B1 | 8/2016 | Ghoshal et al. |
| 9,439,025 B1 | 9/2016 | Ghoshal et al. |
| 9,451,446 B2 | 9/2016 | Spanel et al. |
| 9,532,211 B1 | 12/2016 | Sumner |
| 9,549,009 B1 | 1/2017 | Annan et al. |
| 9,603,009 B1 | 3/2017 | Indurkar |
| 9,681,251 B1 | 6/2017 | Ahn et al. |
| 9,743,271 B2 | 8/2017 | Urbanek |
| 9,794,727 B1 | 10/2017 | Delker et al. |
| 9,913,132 B1 | 3/2018 | Ghoshal et al. |
| 9,992,326 B1 | 6/2018 | Koller et al. |
| 10,021,240 B1 | 7/2018 | Ghoshal et al. |
| 10,306,433 B1 | 5/2019 | Indurkar et al. |
| 10,455,071 B2 | 10/2019 | Burcham et al. |
| 10,506,398 B2 | 12/2019 | Urbanek |
| 2002/0091931 A1 | 7/2002 | Franklin, Jr. et al. |
| 2002/0142783 A1 | 10/2002 | Yoldi et al. |
| 2003/0023514 A1 | 1/2003 | Adler et al. |
| 2003/0031235 A1 | 2/2003 | Kim et al. |
| 2003/0060896 A9* | 3/2003 | Hulai ................ G06F 9/451 700/1 |
| 2003/0081621 A1* | 5/2003 | Godfrey ............ H04L 63/20 370/400 |
| 2003/0188160 A1 | 10/2003 | Sunder et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | OConnor et al. |
| 2004/0116163 A1 | 6/2004 | Kim et al. |
| 2004/0122907 A1* | 6/2004 | Chou ................. H04L 67/26 709/207 |
| 2004/0137890 A1 | 7/2004 | Kalke |
| 2004/0137891 A1 | 7/2004 | Clark et al. |
| 2004/0254975 A1 | 12/2004 | Teh et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0114114 A1 | 5/2005 | Rudolph |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2005/0203703 A1 | 9/2005 | Chang |
| 2005/0253717 A1 | 11/2005 | Howarth et al. |
| 2005/0253718 A1 | 11/2005 | Droms et al. |
| 2006/0025151 A1 | 2/2006 | Karaoguz et al. |
| 2006/0121894 A1 | 6/2006 | Ganesan |
| 2006/0126620 A1 | 6/2006 | Bonar et al. |
| 2006/0135144 A1 | 6/2006 | Jothipragasam |
| 2006/0154651 A1 | 7/2006 | Knowles |
| 2006/0190980 A1 | 8/2006 | Kikkoji et al. |
| 2006/0203722 A1 | 9/2006 | Oommen |
| 2006/0208071 A1 | 9/2006 | Chang |
| 2006/0235944 A1 | 10/2006 | Haslam |
| 2006/0236325 A1 | 10/2006 | Rao et al. |
| 2006/0242150 A1 | 10/2006 | Jogand-Coulomb et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0043667 A1 | 2/2007 | Qawami et al. |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0130286 A1* | 6/2007 | Hopmann ....... H04W 12/04031 709/217 |
| 2007/0165654 A1 | 7/2007 | Chai et al. |
| 2007/0169084 A1 | 7/2007 | Frank et al. |
| 2007/0190939 A1 | 8/2007 | Abel |
| 2007/0192854 A1 | 8/2007 | Kelley et al. |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0022395 A1 | 1/2008 | Holtzman et al. |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0051076 A1 | 2/2008 | OShaughnessy et al. |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0188210 A1 | 8/2008 | Choi et al. |
| 2008/0225806 A1 | 9/2008 | Arian et al. |
| 2008/0276182 A1 | 11/2008 | Leow |
| 2008/0281511 A1 | 11/2008 | Miyata |

(56) References Cited

U.S. PATENT DOCUMENTS

| | | |
|---|---|---|
| 2008/0298559 A1 | 12/2008 | Nanjundaswamy |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1 | 3/2009 | Fleischman et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0157627 A1* | 6/2009 | Arthursson ......... H04L 67/1095 |
| 2009/0217385 A1 | 8/2009 | Teow et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0138652 A1 | 6/2010 | Sela et al. |
| 2010/0159876 A1 | 6/2010 | Brown et al. |
| 2010/0159954 A1 | 6/2010 | Rahman et al. |
| 2010/0161724 A1 | 6/2010 | Sathyan et al. |
| 2010/0161928 A1 | 6/2010 | Sela et al. |
| 2010/0167696 A1 | 7/2010 | Smith et al. |
| 2010/0185434 A1 | 7/2010 | Burvall et al. |
| 2010/0190479 A1 | 7/2010 | Scott et al. |
| 2010/0192120 A1* | 7/2010 | Raleigh ............... H04L 63/10 717/101 |
| 2010/0194632 A1 | 8/2010 | Raento et al. |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0250368 A1 | 9/2010 | Porco |
| 2010/0262638 A1 | 10/2010 | Fitzgerald |
| 2010/0291898 A1 | 11/2010 | Sanding et al. |
| 2010/0311391 A1 | 12/2010 | Siu et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0086611 A1 | 4/2011 | Klein et al. |
| 2011/0119716 A1 | 5/2011 | Coleman, Sr. |
| 2011/0136482 A1 | 6/2011 | Kaliner |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chat et al. |
| 2011/0202233 A1 | 8/2011 | Hatton |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0030512 A1 | 2/2012 | Wadhwa et al. |
| 2012/0035989 A1 | 2/2012 | Abel et al. |
| 2012/0036220 A1* | 2/2012 | Dare .................. H04L 67/04 709/217 |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0054022 A1 | 3/2012 | Kosashvili |
| 2012/0077546 A1 | 3/2012 | Kawa et al. |
| 2012/0079084 A1 | 3/2012 | Forssell et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0142314 A1 | 6/2012 | Mohammed |
| 2012/0142327 A1 | 6/2012 | Urbanek |
| 2012/0151199 A1 | 6/2012 | Shriver |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2012/0309377 A1 | 12/2012 | De Atley et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bolt |
| 2013/0031234 A1 | 1/2013 | Alfano et al. |
| 2013/0031541 A1 | 1/2013 | Wilks et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0124186 A1 | 5/2013 | Donabedian et al. |
| 2013/0137417 A1 | 5/2013 | Urbanek |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Bias, Jr. |
| 2013/0275560 A1 | 10/2013 | Bestmann et al. |
| 2013/0281085 A1 | 10/2013 | Sen et al. |
| 2013/0295902 A1 | 11/2013 | Justen et al. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2013/0318518 A1 | 11/2013 | Paalanen et al. |
| 2013/0326359 A1 | 12/2013 | Beckert et al. |
| 2014/0024332 A1 | 1/2014 | Droste et al. |
| 2014/0045483 A1 | 2/2014 | Whidden |
| 2014/0068779 A1 | 3/2014 | Tan et al. |
| 2014/0074995 A1 | 3/2014 | Beattie, Jr. et al. |
| 2014/0075567 A1 | 3/2014 | Raleigh et al. |
| 2014/0080467 A1 | 3/2014 | Urbanek |
| 2014/0092775 A1 | 4/2014 | Goldman |
| 2014/0099916 A1 | 4/2014 | Mallikarjunan et al. |
| 2014/0113610 A1 | 4/2014 | Ramprasad et al. |
| 2014/0115058 A1* | 4/2014 | Yin .................. H04W 12/06 709/204 |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0213233 A1 | 7/2014 | Parry et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0337752 A1 | 11/2014 | Cammarata |

(56) References Cited

U.S. PATENT DOCUMENTS

| | | |
|---|---|---|
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0033291 A1 | 1/2015 | Nicolau |
| 2015/0040246 A1 | 2/2015 | Yuen et al. |
| 2015/0065105 A1 | 3/2015 | Masterson et al. |
| 2015/0071268 A1 | 3/2015 | Kennedy et al. |
| 2015/0094041 A1 | 4/2015 | Jung et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0220245 A1 | 8/2015 | Wojcik et al. |
| 2015/0242336 A1 | 8/2015 | Loreskar et al. |
| 2015/0271662 A1 | 9/2015 | Lhamon et al. |
| 2015/0304506 A1 | 10/2015 | Zhu et al. |
| 2015/0312873 A1 | 10/2015 | Cormier et al. |
| 2015/0319178 A1 | 11/2015 | Desai et al. |
| 2015/0331590 A1 | 11/2015 | Yasui |
| 2015/0370428 A1 | 12/2015 | Chan |
| 2016/0029204 A1 | 1/2016 | Lalwaney |
| 2016/0044091 A1 | 2/2016 | Doumet |
| 2016/0094931 A1 | 3/2016 | Urbanek |
| 2016/0105843 A1 | 4/2016 | Xue et al. |
| 2016/0165645 A1 | 6/2016 | Commons et al. |
| 2016/0234675 A1 | 8/2016 | Ghoshal et al. |
| 2016/0239317 A1 | 8/2016 | Cuddihy et al. |
| 2016/0255493 A1 | 9/2016 | Lihosit et al. |
| 2017/0150435 A1 | 5/2017 | Tagg et al. |
| 2017/0295450 A1 | 10/2017 | Urbanek |

FOREIGN PATENT DOCUMENTS

| | | |
|---|---|---|
| EP | 2461613 A1 | 6/2012 |
| EP | 2765794 A1 | 8/2014 |
| GB | 2292047 A | 2/1996 |
| GB | 2548038 A | 9/2017 |
| JP | H11-94923 | 4/1999 |
| JP | 2006-20256 A | 1/2006 |
| JP | 201285272 A | 4/2012 |
| JP | 2012-527206 A | 11/2012 |
| JP | 2012-529857 A1 | 11/2012 |
| JP | 2015505190 A | 2/2015 |
| JP | 5924347 B2 | 4/2016 |
| JP | 6270066 B2 | 1/2018 |
| JP | 6273585 B2 | 1/2018 |
| JP | 6277455 B2 | 1/2018 |
| JP | 6288654 B2 | 2/2018 |
| JP | 6387579 B2 | 8/2018 |
| JP | 6443452 B2 | 12/2018 |
| JP | 6493922 | 3/2019 |
| KR | 2006039974 A | 5/2006 |
| WO | WO2007066413 A1 | 6/2007 |
| WO | WO2010135257 A1 | 11/2010 |
| WO | WO2011159549 A1 | 6/2011 |
| WO | WO2012078753 A1 | 6/2012 |
| WO | WO2013169983 A1 | 11/2013 |
| WO | WO2014020237 A1 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |
| WO | WO2016130266 A1 | 8/2016 |

OTHER PUBLICATIONS

Decision on Appeal dated Oct. 11, 2019, U.S. Appl. No. 15/063,383, filed Mar. 7, 2016.
Final Office Action dated Apr. 19, 2016, U.S. Appl. No. 14/231,718, filed Mar. 31, 2014.
Advisory Action dated Jun. 28, 2016, U.S. Appl. No. 14/231,718, filed Mar. 31, 2014.
Office Action dated Oct. 6, 2016, U.S. Appl. No. 14/231,718, filed Mar. 31, 2014.
Notice of Allowance dated Feb. 21, 2017, U.S. Appl. No. 14/231,718, filed Mar. 31, 2014.
FAIPP Pre-Interview Communication dated Nov. 4, 2016, U.S. Appl. No. 14/530,666, filed Oct. 31, 2014.
FAIPP Office Action dated Jan. 31, 2017, U.S. Appl. No. 14/530,666, filed Oct. 31, 2014.
Final Office Action dated May 30, 2017, U.S. Appl. No. 14/530,666, filed Oct. 31, 2014.
Advisory Action dated Aug. 10, 2017, U.S. Appl. No. 14/530,666, filed Oct. 31, 2014.
Office Action dated Oct. 5, 2017, U.S. Appl. No. 14/530,666, filed Oct. 31, 2014.
Notice of Allowance dated Feb. 13, 2018, U.S. Appl. No. 14/530,666, filed Oct. 31, 2014.
FAIPP Pre-Interview Communication dated Jul. 8, 2015, U.S. Appl. No. 14/475,399, filed Sep. 2, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
FAIPP Pre-Interview Communication dated Sep. 6, 2017, U.S. Appl. No. 15/063,383, filed Mar. 7, 2016.
FAIPP Office Action dated Oct. 16, 2017, U.S. Appl. No. 15/063,383, filed Mar. 7, 2016.
Final Office Action dated Jan. 18, 2018, U.S. Appl. No. 15/063,383, filed Mar. 7, 2016.
Examiner's Answer dated Jul. 10, 2018, U.S. Appl. No. 15/063,383, filed Mar. 7, 2016.
JP Office Action dated Mar. 31, 2019, JP Application No. 2017-526939, filed on May 18, 2017.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
FAIPP Pre-Interview Communication dated Apr. 10, 2017, U.S. Appl. No. 15/164,530, filed May 25, 2016.
Notice of Allowance dated Jun. 14, 2017, U.S. Appl. No. 15/164,530, filed May 25, 2016.
FAIPP Pre-Interview Communication dated Dec. 28, 2107, U.S. Appl. No. 15/268,347, filed Sep. 16, 2016.
Notice of Allowance dated Mar. 22, 2018, U.S. Appl. No. 15/268,347, filed Sep. 16, 2016.
Office Action dated May 31, 2017, U.S. Appl. No. 15/265,833, filed Sep. 14, 2016.
Notice of Allowance dated Oct. 27, 2017, U.S. Appl. No. 15/265,833, filed Sep. 14, 2016.
Restriction Requirement dated Mar. 13, 2018, U.S. Appl. No. 15/584,001, filed May 1, 2017.
Pre-Interview Communicated dated Jun. 26, 2018, U.S. Appl. No. 15/584,001, filed May 1, 2017.
Final Office Action dated Oct. 25, 2018, U.S. Appl. No. 15/584,001, filed May 1, 2017.
Advisory Action dated Dec. 21, 2018, U.S. Appl. No. 15/584,001, filed May 1, 2017.
Notice of Allowance dated Jan. 24, 2019, U.S. Appl. No. 15/584,001, filed May 1, 2017.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736, filed on Dec. 7, 2011.
Foreign Communication from a Related Counterpart Application, "Preliminary Report on Patentability," dated Nov. 20, 2014, PCT/US13/40278, filed on May 9, 2013.

(56) References Cited

OTHER PUBLICATIONS

Foreign Communication from a Related Counterpart—International Search Report and Written Opinion, dated Nov. 14, 2013, PCT/US13/55023, filed on Aug. 15, 2013.
Foreign Communication from a Related Counterpart—International Preliminary Report on Patentability, dated Apr. 2, 2015, PCT/US13/55023, filed on Aug. 15, 2013.
Foreign Communication from a Related Counterpart Application, International Search Report and Written Opinion dated Jan. 24, 2014, PCT/US13/68981, filed on Nov. 7, 2013.
Foreign Communication From a Related Counterpart Application, International Preliminary Report on Patentability dated Jul. 30, 2015, PCT/US13/68981, filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart Application, International Preliminary Report on Patentability dated Aug. 20, 2015, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Foreign Communication from a Related Counterpart Application, International Preliminary Report on Patentability dated Aug. 20, 2015, PCT/US14/13939, filed on Jan. 30, 2014.
Foreign Communication from a Related Counterpart—International Search Report and Written Opinion, dated Jun. 3, 2014, PCT/US14/16650, filed on Feb. 16, 2014.
Foreign Communication from a Related Counterpart Application, International Preliminary Report on Patentability dated Sep. 24, 2015, PCT/US14/16650, filed on Feb. 16, 2014.
Foreign Communication from a Related Counterpart—International Search Report and Written Opinion, dated Dec. 17, 2014, PCT/US14/46773, filed on Jul. 16, 2014.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Dec. 30, 2014, PCT/US14/56778, filed on Sep. 22, 2014.
Foreign Communication from a Related Counterpart—International Search Report and Written Opinion, dated Apr. 4, 2016, PCT/US16/13272, filed on Jan. 13, 2016.
Foreign Communication from a Related Counterpart—International Preliminary Report on Patentability, dated Aug. 24, 2017, PCT/US16/13272, filed on Jan. 13, 2016.
Amazon Kindle e-book reader, on public sale 2007, http://en.wikipedia.org/wiki/Amazon_Kindle. last accessed on Apr. 13, 2015.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle at Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Benjamin, Jeff, "How to change your iPhone carrier logo without jailbreaking," idownloadblog.com, Dec. 31, 2012.
Wikipedia, "Motorola Fone," Mar. 21, 2016.
Mobile Gazette, "Motorola Fone F3 Review," www.mobilegazette.com, Sep. 16, 2007.
Yota Devices, "Hands-on with the YotaPhone: the e-ink Android phone that nobody expected," New York Times, 2010.
Indurkar, Dhananjay, "Mobile Phone Differentiated Set-Up," filed May 1, 2017, U.S. Appl. No. 15/584,001.
EP Summons to Attend Oral Hearing dated Feb. 2, 2019, European Application Serial No. 13871478.7 filed on Jan. 18, 2013.

Japanese Decision for Grant dated Dec. 19, 2017, Japanese Application Serial No. 2015-556971; filed on Jun. 24, 2015.
FAIPP Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Notice of Allowance dated Mar. 26, 2015, U.S. Appl. No. 13/763,434, filed Feb. 8, 2013.
EP Search Report dated Aug. 24, 2016, European Application Serial No. 14749462.9, filed on Feb. 8, 2013.
JP Office Action dated Feb. 28, 2018, Japanese Application Serial No. 2015-556972; filed on Jun. 25, 2015.
JP Office Action dated Oct. 30, 2018, Japanese Application Serial No. 2015-556972; filed on Jun. 25, 2015.
Japanese Decision for Granted dated Feb. 5, 2019, Japanese Application Serial No. 2015-556972; filed on Jun. 25, 2015.
FAIPP Pre-Interview Communication dated Apr. 23, 2015, U.S. Appl. No. 13/763,443, filed Feb. 8, 2013.
First Action Interview Office Action dated Jun. 16, 2015, U.S. Appl. No. 13/763,443, filed Feb. 8, 2013.
Final Office Action dated Aug. 10, 2015, U.S. Appl. No. 13/763,443, filed Feb. 8, 2013.
Advisory Action dated Nov. 3, 2015, U.S. Appl. No. 13/763,443, filed Feb. 8, 2013.
Office Action dated May 3, 2016, U.S. Appl. No. 13/763,443, filed Feb. 8, 2013.
Notice of Allowance dated Sep. 12, 2016, U.S. Appl. No. 13/763,443, filed Feb. 8, 2013.
Office Action dated Aug. 7, 2014, U.S. Appl. No. 13/831,504, filed Mar. 14, 2013.
Notice of Allowance dated Dec. 29, 2014, U.S. Appl. No. 13/831,504, filed Mar. 14, 2013.
Office Action dated Jun. 16, 2015, U.S. Appl. No. 13/899,567, filed May 22, 2013.
Notice of Allowance dated Oct. 26, 2015, U.S. Appl. No. 13/899,567, filed May 22, 2013.
FAIPP Pre-Interview Communication dated Mar. 12, 2015, U.S. Appl. No. 13/972,827, filed Aug. 21, 2013.
Notice of Allowance dated May 7, 2015, U.S. Appl. No. 13/972,827, filed Aug. 21, 2013.
FAIPP Pre-Interview Communication dated Feb. 25, 2016, U.S. Appl. No. 14/820,522, filed Aug. 6, 2015.
Notice of Allowance dated May 6, 2016, U.S. Appl. No. 14/820,522, filed Aug. 6, 2015.
FAIPP Pre-Interview Communication dated Nov. 20, 2014, U.S. Appl. No. 13/899,566, filed May 21, 2013.
Notice of Allowance dated Jan. 22, 2015, U.S. Appl. No. 13/899,566, filed May 21, 2013.
FAIPP Pre-Interview Communication dated Oct. 16, 2015, U.S. Appl. No. 14/060,712, filed Oct. 23, 2013.
Final Office Action dated Mar. 9, 2016, U.S. Appl. No. 14/060,712, filed Oct. 23, 2013.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
Foreign Office Action dated Jul. 7, 2015, Japanese Application Serial No. 2013-543310, filed Jul. 7, 2015.
Foreign Notice of Allowance dated Mar. 21, 2016, Japanese Application Serial No. 2013-543310, filed Jul. 7, 2015.
EP Search Report dated Oct. 12, 2016, EP International Application No. 11847301.6, filed on Jun. 20, 2013.
EP Exam Report dated May 25, 2018, EP International Application No. 11847301.6, filed on Jun. 20, 2013.
FAIPP Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.

(56) References Cited

OTHER PUBLICATIONS

FAIPP Pre-Interview Communication dated Sep. 22, 2014, U.S. Appl. No. 13/468,028, filed May 9, 2012.
First Action Interview Office Action dated Mar. 16, 2015, U.S. Appl. No. 13/468,028, filed May 9, 2012.
Final Office Action dated Nov. 4, 2015, U.S. Appl. No. 13/468,028, filed May 9, 2012.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
Final Office Action dated Oct. 26, 2016, U.S. Appl. No. 13/468,028, filed May 9, 2012.
Examiner's Answer dated Aug. 14, 2017, U.S. Appl. No. 13/468,028, filed May 9, 2012.
JP Office Action dated Mar. 28, 2017, JP Application Serial No. 2015-511682; filed on Oct. 15, 2014.
JP Decision to Grant dated Dec. 5, 2017, JP Application Serial No. 2015-511682; filed on Oct. 15, 2014.
FAIPP Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
FAIPP Pre-Interview Communication dated Jun. 2, 2015, U.S. Appl. No. 14/152,627, filed Jan. 10, 2013.
Notice of Allowance dated Aug. 6, 2015, U.S. Appl. No. 14/152,627, filed Jan. 10, 2013.
FAIPP Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Advisory Action dated Dec. 17, 2014, U.S. Appl. No. 13/622,234, filed Sep. 18, 2012.
Office Action dated Mar. 2, 2015, U.S. Appl. No. 13/622,234, filed Sep. 18, 2012.
Notice of Allowance dated Jul. 15, 2015, U.S. Appl. No. 13/622,234, filed Sep. 18, 2012.
Japanese Office Action dated Apr. 13, 2017, JP Application Serial No. 2015-531933; filed on Feb. 16, 2015.
Japanese Final Office Action dated Aug. 23, 2017, JP Application Serial No. 2015-531933; filed on Feb. 16, 2015.
JP Decision to Grant dated Dec. 12, 2017, JP Application Serial No. 2015-531933; filed on Feb. 16, 2015.
FAIPP Pre-Interview Communication dated Jan. 11, 2016, U.S. Appl. No. 14/877,215, filed Oct. 7, 2015.
Notice of Allowance dated Apr. 13, 2016, U.S. Appl. No. 14/877,215, filed Oct. 7, 2015.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Mar. 26, 2015, U.S. Appl. No. 14/522,586, filed Oct. 24, 2014.
Notice of Allowance dated Jul. 7, 2015, U.S. Appl. No. 14/522,586, filed Oct. 24, 2014.
FAIPP Pre-Interview Communication dated Jul. 16, 2014, U.S. Appl. No. 13/744,861, filed Jan. 18, 2013.
Notice of Allowance dated Nov. 20, 2014, U.S. Appl. No. 13/744,861, filed Jan. 18, 2013.
EP Search Report dated Jul. 7, 2016, European Application Serial No. 13871478.7 filed on Jan. 18, 2013.
EP Exam Report dated Dec. 14, 2017, European Application Serial No. 13871478.7 filed on Jan. 18, 2013.
EP Second Exam Report dated Jun. 15, 2018, European Application Serial No. 13871478.7 filed on Jan. 18, 2013.
Japanese Office Action dated Sep. 6, 2017, Japanese Application Serial No. 2015-553721; filed on Jan. 18, 2013.
Japanese Decision for Grant dated Jan. 9, 2018, Japanese Application Serial No. 2015-553721; filed on Jan. 18, 2013.
FAIPP Pre-Interview Communication dated Apr. 8, 2015, U.S. Appl. No. 13/844,104, filed Mar. 15, 2013.
Notice of Allowance dated Jul. 16, 2015, U.S. Appl. No. 13/844,104, filed Mar. 15, 2013.
FAIPP Pre-Interview Communication dated Oct. 22, 2014, U.S. Appl. No. 13/763,428, filed Feb. 8, 2013.
Notice of Allowance dated Mar. 20, 2015, U.S. Appl. No. 13/763,428, filed Feb. 8, 2013.
EP Search Report dated May 17, 2016, European Application No. 14749499.1, filed on Feb. 8, 2013.
EP Notice of Intention to Grant dated May 26, 2017, European Application No. 14749499.1, filed on Feb. 8, 2013.
Advisory Action dated May 3, 2016, U.S. Appl. No. 14/060,712, filed Oct. 23, 2013.
Office Action dated Dec. 29, 2016, U.S. Appl. No. 14/060,712, filed Oct. 23, 2013.
Notice of Allowance dated Apr. 17, 2017, U.S. Appl. No. 14/060,712, filed Oct. 23, 2013.
JP Office Action dated Apr. 10, 2018, JP Application No. 2016-550459, filed on Feb. 25, 2016.
JP Office Action dated Aug. 7, 2018, JP Application No. 2016-550459, filed on Feb. 25, 2016.
JP Decision for Grant dated Oct. 30, 2018, JP Application No. 2016-550459, filed on Feb. 25, 2016.
FAIPP Pre-Interview Communication dated Mar. 8, 2019, U.S. Appl. No. 15/633,737, filed Jun. 26, 2017.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Final Office Action dated Feb. 24, 2016, U.S. Appl. No. 14/060,719, filed Oct. 23, 2013.
Advisory Action dated Apr. 20, 2016, U.S. Appl. No. 14/060,719, filed Oct. 23, 2013.
Office Action dated Jun. 6, 2016, U.S. Appl. No. 14/060,719, filed Oct. 23, 2013.
Final Office Action dated Jan. 26, 2017, U.S. Appl. No. 14/060,719, filed Oct. 23, 2013.
Advisory Action dated Mar. 24, 2017, U.S. Appl. No. 14/060,719, filed Oct. 23, 2013.
Examiner's Answer dated Aug. 28, 2017, U.S. Appl. No. 14/060,719, filed Oct. 23, 2013.
FAIPP Pre-Interview Communication dated Apr. 15, 2015, U.S. Appl. No. 14/085,474, filed Nov. 20, 2013.
Notice of Allowance dated May 29, 2015, U.S. Appl. No. 14/085,474, filed Nov. 20, 2013.
FAIPP Pre-Interview Communication dated Sep. 29, 2015, U.S. Appl. No. 14/163,035, filed Jan. 24, 2014.
Final Office Action dated Feb. 16, 2016, U.S. Appl. No. 14/163,035, filed Jan. 24, 2014.
Office Action dated May 10, 2016, U.S. Appl. No. 14/163,035, filed Jan. 24, 2014.
Notice of Allowance dated Nov. 2, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Final Office Action dated Jun. 14, 2016, U.S. Appl. No. 13/968,259, filed Aug. 15, 2013.
Fotice of Allowance dated Aug. 18, 2016, U.S. Appl. No. 13/968,259, filed Aug. 15, 2013.
FAIPP Pre-Interview Communication dated Mar. 4, 2015, U.S. Appl. No. 14/010,518, filed Aug. 27, 2013.
Notice of Allowance dated May 8, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
Notice of Allowance dated Jul. 8, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
Notice of Allowance dated Jun. 26, 2015, U.S. Appl. No. 14/010,523, filed Aug. 27, 2013.

(56) References Cited

OTHER PUBLICATIONS

FAIPP Pre-Interview Communication dated Mar. 10, 2015, U.S. Appl. No. 14/010,524, filed Aug. 27, 2013.
Notice of Allowance dated Apr. 28, 2015, U.S. Appl. No. 14/010,524, filed Aug. 27, 2013.
JP Office Action dated Apr. 6, 2018, JP Application No. 2016-538920, filed on Mar. 3, 2016.
Decision to Grant dated Jul. 16, 2018, JP Application No. 2016-538920, filed on Mar. 3, 2016.
Restriction Requirement dated May 21, 2015, U.S. Appl. No. 14/073,321, filed Nov. 6, 2013.
FAIPP Pre-Interview Communication dated Aug. 20, 2015, U.S. Appl. No. 14/073,321, filed Nov. 6, 2013.
Notice of Allowance dated Nov. 4, 2015, U.S. Appl. No. 14/073,321, filed Nov. 6, 2013.
FAIPP Pre-Interview Communication dated Apr. 8, 2015, U.S. Appl. No. 14/157,507, filed Jan. 16, 2014.
First Action Interview Office Action dated Oct. 16, 2015, U.S. Appl. No. 14/157,507, filed Jan. 16, 2014.
Notice of Allowance dated Feb. 25, 2016, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
Notice of Allowance dated Jan. 27, 2016, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
First Action Interview Office Action dated Feb. 2, 2016, U.S. Appl. No. 14/297,429, filed Jun. 5, 2014.
Notice of Allowance dated Apr. 20, 2016, U.S. Appl. No. 14/297,429, filed Jun. 5, 2014.
FAIPP Pre-Interview Communication dated Jul. 15, 2015, U.S. Appl. No. 14/163,041, filed Jan. 24, 2014.
Final Office Action dated Jan. 12, 2016, U.S. Appl. No. 14/163,041, filed Jan. 24, 2014.
Notice of Allowance dated Apr. 13, 2016, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
First Action Interview Office Action dated Jan. 19, 2016, U.S. Appl. No. 14/231,718, filed Mar. 31, 2014.
EP Exam Report dated Jun. 13, 2019, EP International Application No. 11847301.6, filed on Jun. 20, 2013.
EP Examiner's Communication dated Jun. 19, 2019, European Application Serial No. 13871478.7 filed on Jan. 18, 2013.
Decision on Appeal dated May 14, 2019, U.S. Appl. No. 13/468,028, filed May 9, 2012.
Notice of Allowance dated Jun. 24, 2019, U.S. Appl. No. 13/468,028, filed May 9, 2012.
EP Search Report dated Feb. 28, 2019, European Application Serial No. 14749462.9, filed on Feb. 8, 2013.
Notice of Allowance dated Apr. 17, 2019, U.S. Appl. No. 15/633,737, filed Jun. 26, 2017.
Decision on Appeal dated Jun. 24, 2019, U.S. Appl. No. 14/060,719, filed Oct. 23, 2013.
Notice of Allowance dated Jul. 12, 2019, U.S. Appl. No. 14/060,719, filed Oct. 23, 2013.
EP Examining Division—Decision at Oral Proceedings dated Jul. 24, 2019, European Application Serial No. 13871478.7 filed on Jan. 18, 2013.

\* cited by examiner

MOBILE PHONE DIFFERENTIATED USER SET-UP

CROSS-REFERENCE TO RELATED APPLICATIONS

This application is a divisional of and claims priority under 35 U.S.C. § 120 to U.S. application Ser. No. 15/584,001, filed May 1, 2017 and entitled "Mobile Phone Differentiated Acknowledgment," which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A user equipment (UE), e.g., a mobile phone, may be inactive when it is first powered on, for example when first received by an end user. The UE may undergo an activation process that configures the UE with radio access network (RAN) credentials as well as provisions the UE for service in a wireless communication network. The UE may be provided with a limited wireless communication service before activation is completed, for example restricting the UE to accessing servers associated with activation procedures and blocking access of the UE to the open Internet.

The UE may also be a generic unbranded device when first powered on. The UE may further undergo branding operations in the early phases of deployment to an end user. For example, the branding process may install branded content into the UE such as power-on videos, power-off videos, and a brand logo for presentation on a display of the UE. The branding process may configure links to an application store associated with the brand. The branding process may configure a speed dial setting to reach customer care.

SUMMARY

In an embodiment, a method of activating a mobile communication device to receive wireless communication service and to configure user settings on the mobile communication device is disclosed. The method comprises performing an activation of a mobile communication device by an activation application that executes on the mobile communication device, wherein the activation process installs wireless network access credentials into the mobile communication device, monitoring the activation application by a user configuration software service layer installed on the mobile communication device, and determining by the software service layer that the mobile communication device activation has completed. The method further comprises, in response to determining that the mobile communication device activation has completed, sending a message by the software service layer to a first computer system to request an identity of a second computer system from which to obtain user settings configuration instructions, receiving a response message by the software service layer from the first computer system, wherein the response message comprises the identity of the second computer system, sending a user settings request message by the software service layer to the second computer system, receiving a user settings response message by the software service layer from the second computer system, and configuring user settings on the mobile communication device by the software service layer by executing instructions received in the user settings response message. The method further comprises receiving a brand configuration package by a branding application executing on the mobile communication device, wherein the brand configuration package comprises one of a power-on animation, a power-off animation, wallpaper, a ringtone, a link to an application store, a short code of a customer care center, a short code of voice mail, or a combination thereof, and storing the brand configuration package by the branding application into a non-volatile portion of a memory of the mobile communication device, whereby a brand is configured on the mobile communication device by the branding application.

In another embodiment, a method of configuring user settings on a mobile communication device is disclosed. The method comprises sending a message by a software service layer of a mobile communication device to a first computer system to request an identity of a second computer system from which to obtain user settings configuration instructions, and receiving a response message by the software service layer from the first computer system, wherein the response message comprises the identity of the second computer system. The method further comprises sending a user settings request message by the software service layer to the second computer system, receiving a user settings response message by the software service layer from the second computer system, and configuring user settings on the mobile communication device by the software service layer by executing instructions received in the user settings response message.

In yet another embodiment, a computer system is disclosed. The computer system comprises a non-transitory memory, a processor, a user set-up package builder application stored in the non-transitory memory. When executed by the processor, the user set-up package builder receives inputs from a user interface of the package builder application, where the inputs define rules for associating a plurality of user settings to a user based on a group membership of the user, receives a user settings request message from a user configuration software service layer executing on a mobile communication device, where the request message comprises an identity of the mobile communication device, and determines a group membership of the mobile communication device based on the identity of the mobile communication device. The user set-up package builder further, based on the group membership of the mobile communication device and based on rules for associating user settings to a user based on group membership, creates a package comprising user settings and instructions to be executed by the mobile communication device to configure itself according to the user settings and sends the package comprising user settings and instructions to be executed by the mobile communication device to the mobile communication device, whereby the mobile communication device configures itself with the user settings by executing the instructions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
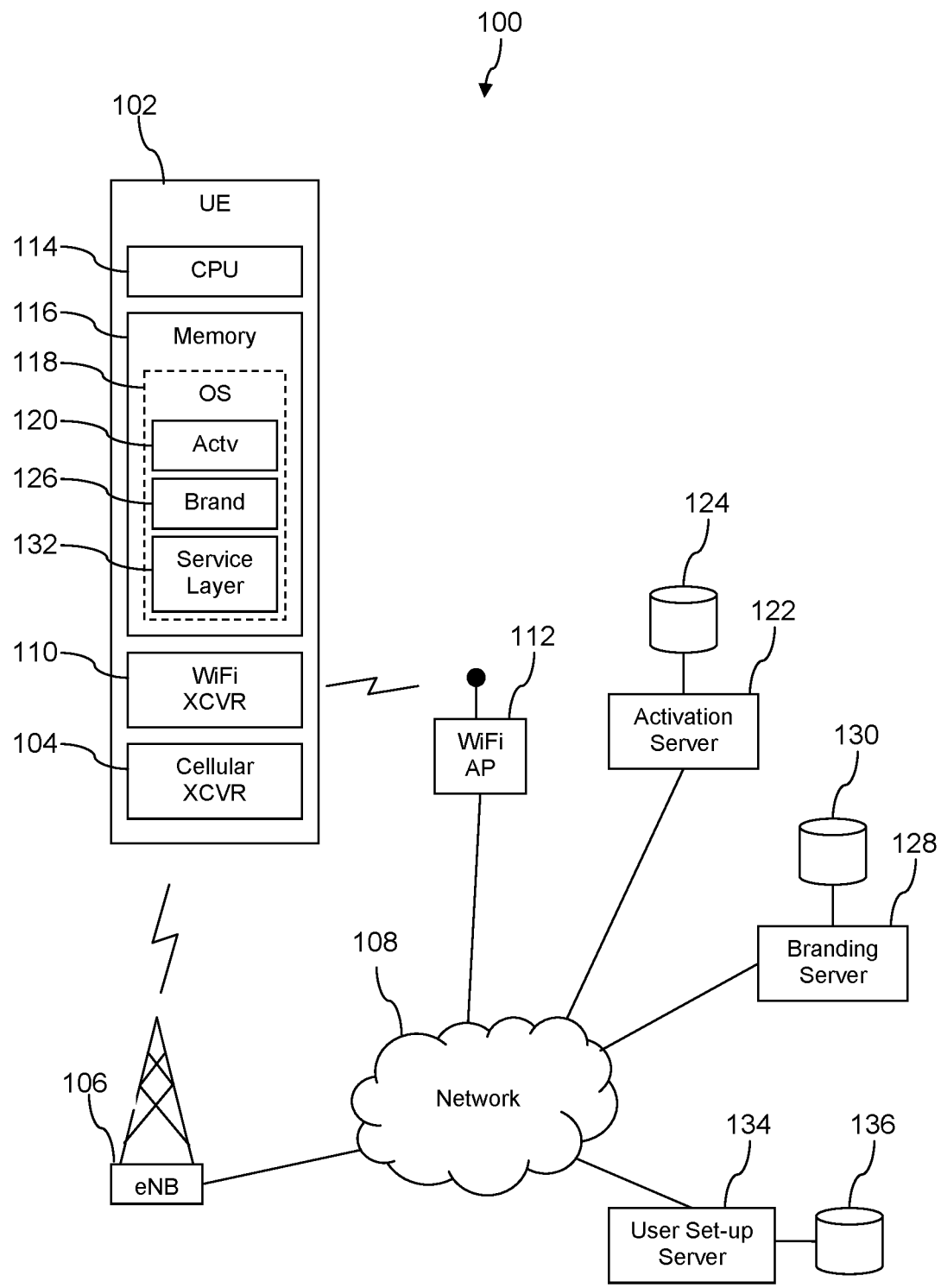
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a software service layer on a user equipment (UE) that promotes installing user settings and configurations pursuant to a user obtaining a new phone. In some contexts herein user settings may be used as a term that encompasses both user settings and user configurations to achieve greater conciseness. User settings and configurations may be highly differentiated from one user to another user. For example, different users receiving a corporate sponsored UE (e.g., employees of a corporation who are provided with a "work phone" by his or her employer) may have enterprise applications, enterprise passwords, digital certificates, and other information configured on their devices that are different. For example, an information technology (IT) employee may have passwords to corporate firewall equipment and routers and specialized IT related mobile applications or clients installed on his or her UE that are not installed on the UE of a director of sales. The director of sales may have applications related to confidential marketing data and pricing offers on his or her UE that are not installed on the UE of the IT employee. The different applications and/or clients that are installed on UEs of different employees of the same enterprise or corporations may have leasing implications for the enterprise or corporation if the applications or clients are proprietary software products developed by a third party. The user settings and configurations are further differentiated between users of different corporations. Managing such differentiated user settings and configurations by a wireless service provider across a plurality of corporations would be a daunting challenge.

The present disclosure teaches the software service layer requesting a wireless service provider to identify an appropriate source from which the software service layer is to retrieve user settings, user applications, and instructions to execute to configure the user settings and install the user applications on the UE. For example, the software service layer may send a source identity request message containing the identity of the UE (e.g., mobile equipment identity or other identifier of the UE) to a server in the wireless service provider network. The wireless service provider network (e.g., a computer system in the provider domain) may map the identity of the UE to a uniform resource locator (URL), an Internet protocol (IP) address, or a domain name of a server in an enterprise or corporate internal network and pass this IP address or domain name back to the software service layer. The communication between the software service layer and/or the UE and the server in the wireless service provider network, in an embodiment, is carried over a secure connection established between the UE and the server in the wireless service provider network.

For example, a server computer operated by the wireless service provider may provide an application programming interface (API) to the UE to access a data store based on the identity or identities of the UE to retrieve the URL, IP address, or domain name of the server in the enterprise or corporate internal network. This may be referred to as mapping the identity of the UE to the server URL, IP address, or domain name, or simply mapping the identity of the UE to the server. This mapping may be configured into the data store by an administrator in the wireless service provider network or by a provisioning tool operated by the wireless service provider to support enterprise purchases of wireless communication services.

The software service layer may then reach out to the subject URL, IP address, or domain name, sending a user set-up request message comprising the identity of the UE. The server computer referenced by the URL, IP address, or domain name may look up an appropriate user set-up package, based on the identity of the UE, and return this to the UE. The UE may then store at least some of the contents of the user set-up package it has received into a non-volatile portion of a memory of the UE. The wireless communication service provider may share device and subscriber information such as device identity and phone number with the device owner (e.g., enterprise, small business, hospital, governmental department, etc.) in advance so the association between the device identity and the user set-up package can be created in advance of device activation. In an embodiment, the communication between the UE and the server computer referenced by the URL, IP address, or domain name may be carried over a secure connection established between the UE and the referenced server computer.

The user set-up package comprises UE configuration settings that are specific to the user of the UE and/or specific to a group to which the user of the UE belongs. In some cases, the user set-up package may further comprise mobile applications that are suitable for the user of the UE or to the group the user of the UE belongs to, for example a specific work related application that is promoted by the user's employer to support the user in performing his or her job. The user set-up package may comprise a security certificate, a password, and/or a virtual private network (VPN) access code or security certificate that is stored into the non-volatile portion of UE memory. The user set-up package may comprise settings that activate parental controls on the UE, for example when the UE is used by a dependent child or minor child of a family wireless subscription plan.

The user set-up package comprises one or more sets of instruction or scripts to be executed on the UE, possibly in the execution context of the software service layer, that configure the UE configuration settings provided in the user set-up package into the appropriate registers and locations in the memory of the UE and that installs any mobile applications that are included in the user set-up package.

The software service layer may use the user set-up package to complete configuration of user settings and configurations and user applications on the UE. These user settings and configurations may include passwords, access settings, and user profiles for computer networks, server computers, applications, accounts; list of contacts; lists of customers; mobile applications for installation on the UE; and other settings or configurations. The server computer referenced by the URL, IP address, or domain name may be referred to herein as the enterprise server to distinguish it from a server maintained by the wireless communication service provider, but it is understood that the server computer referenced by the URL, IP address, or domain name may be a server maintained by another entity, different from the service provider, or by a cloud computer. The enterprise server may extend an API for enterprise personnel to create different user set-up packages for different groups of users (e.g., different work groups or work departments) or even for different specific individuals.

In an embodiment, the server computer referenced by the IP address or domain name may create the appropriate user set-up package in real-time, in response to the request received from the UE. A set of rules may be established, for example by an engineer or other employee, using a user interface of a user set-up package builder tool that executes on the server computer. These rules may identify what user settings to configure, what user applications to install, and what digital certificates and/or passwords to configure on a UE of a class of users or even each of a number of individual users. These rules can also define automation processes to be performed in the corporate or enterprise domain with reference to registering, accounting for, and paying fees associated with installation of proprietary third party applications or clients on the UE. When the request comes in from the UE for the user settings, the user set-up package builder tool may first determine what class of user the subject UE belongs to and identify the appropriate rules to use. The user set-up package builder then builds a user set-up package based on the selected rules, and returns the created user set-up package to the UE. The software service layer then uses the user set-up package to configure the desired user settings.

When first powered on, the UE may initially undergo an activation process that configures the UE for communication. This activation process may configure the UE for WiFi communication, and further activation, brand configuration, and user set-up configuration may take place via the WiFi communication channel. Alternatively, the activation process may configure the UE for cellular communication via a wireless link to a radio access network (RAN).

After the activation process is complete, the UE may further perform a branding operation, whereby the UE may be transformed from an unbranded, generic device to a branded device. This branding activity may take place concurrently with the user set-up operations. Branding may comprise storing brand information into non-volatile portions of a memory of the UE such that the UE can use this brand information to make the phone conform to the brand. Such banding information may comprise power-on animations, power-off animations, wallpaper, a ringtone, a link to an application store, a short code or phone number of customer care center, a short code or phone number of voice mail, one or more applications. Thus, when the UE is active, the brand wallpaper may be seen as a background to foreground icons on a display of the UE, whereby a user and others can readily discern that this UE is associated with the brand; the power-on and power-off animations likewise indicate to the user and others that this UE is associated with the brand and other features. More specifically, when the UE is active, a display application or process that executes on the UE may render the brand wallpaper on the display of the UE and overlay foreground graphic artifacts, such as icons, on top of the wallpaper; an initiation application that executes on the UE during boot and/or power-on may present the power-on animation on the display and through a speaker while the UE is booting; another application that executes on the UE during shut-down may present the power-off animation on the display and through a speaker of the UE.

Turning now to FIG. 1, a communication system 100 is described. In an embodiment, the system 100 comprises a user equipment (UE) 102 that has a cellular radio transceiver 104 that is configured to establish a wireless communication link with a cell site 106. The cell site 106 may communicatively couple the UE 102 to the network 108 to promote the UE 102 conducting voice communications and/or data communications with devices that are themselves communicatively coupled to the network 108. The UE 102 further may comprise a WiFi radio transceiver 110 that is configured to establish a wireless communication link with a WiFi access point (AP) 112. The WiFi AP 112 may communicatively couple the UE 102 to the network 108 to promote the UE 102 conducting voice and/or data communications with devices that are communicatively coupled to the network 108.

The UE 102 may be a mobile communication device, a mobile phone, a smart phone, a personal digital assistant (PDA), a media player, a wearable computer, a headset computer, a laptop computer, a tablet computer, or a notebook computer. The network 108 may comprise one or more public networks, one or more private networks, or a combination thereof. The cell site 106 may provide a wireless link to the UE 102 according to a long term evolution (LTE), a code division multiple access (CDMA), a global system for mobile communications (GSM), or a worldwide interoperability for microwave access (WiMAX) wireless communication protocol. Depending on the wireless communication protocol used, the cell site 106 may be referred to with different terms such as an enhanced node B (eNB, for example in a LTE technology environment) or a base transceiver station (BTS, for example in a GSM technology environment). In an embodiment, the WiFi radio transceiver 110 may be a different short range radio transceiver (e.g., where short range radio is restricted to a practical maximum range of about 500 feet) that is not a WiFi technology-based radio, and the WiFi AP 112 may be a different short range radio access point that is not a WiFi technology-based access point.

During initial deployment and/or activation of the UE 102, the cellular radio transceiver 104 may be unable to establish a wireless link with the cell site 106 or the WiFi radio transceiver 110 may be unable to establish a wireless link with the WiFi AP 112. During initial deployment and/or activation, the UE 102 may be able to establish only a restricted wireless communication functionality, for example a wireless communication functionality restricted to initiating and conducting an emergency call (e911 call) and restricted to perform activation related communication.

The UE 102 further comprises a processor 114 that executes various programs, instructions, and scripts and a memory 116 that stores an operating system (OS) 118. The OS 118 may be stored in a non-transitory portion of the memory 116 and may be executed by the processor 114. The OS 118 may comprise an activation application 120 that is executed by the processor 114 to perform activation of the UE 102 when it is first deployed and powered on (e.g., when a user obtains the UE 102 as a new device and has not yet powered it on and initiated the device for communication operation). The activation application 120 may collaborate with an activation server 122 and an activation data store 124 via the network 108 to perform a wireless communication service activation process. The activation process may include the activation server 122 looking up the details of the subscription account plan associated with the UE 102, based on the mobile equipment identity (MEID) of the UE 102 and obtaining radio access network (RAN) authorization or access credentials for the UE 102. The activation server 122 may then send the RAN access credential to the UE 102, and the activation application 120 may store the RAN access credential in a non-volatile portion of the memory 116. When UE 102 attempts to attach to the RAN, for example to conduct a voice call or a data call, the UE 102 may present the RAN access credential to the cell site 106. The activation server 122 may perform a variety of provisioning actions on one or more servers or network nodes and/or data stores within the wireless communication service provider network domain.

The OS 118 may comprise a branding application 126 that is executed by the processor 114 to perform a branding process on the UE 102. The branding application 126 may collaborate with a branding server 128 and a branding data store 130 to obtain appropriate brand content and brand settings. In an embodiment, the branding application 126 may reach out to an open mobile alliance device management (OMA-DM) server (e.g., the branding server 128 or another server (not shown)) to obtain a DM package. The branding application 126 may then complete branding based on the DM package. Before the branding process performed, at least in part, by the branding application 126 the UE 102 may be unbranded and may be suitable to branding to any of a plurality of different service brands. The branding content may comprise power-on videos, power-off videos, display logos, logo graphics, ring tones, and other content. The branding settings may include links to a brand appropriate mobile application store and a brand specific customer care call center speed dial setting. The branding process may be performed after completion of the device activation process by the activation application 120 and either before, during, or after completion of a user set-up process on the UE 102.

The OS 118 may comprise a software service layer 132 that promotes configuring user settings and installing use applications on the UE 102. The software service layer 132 executes on the processor 114. The software service layer 132 may be embedded in or contained as a component of the OS 118. Alternatively, in an embodiment, the software service layer 132 may "ride on top of" the OS 118 and execute application programing interface (API) methods extended by the OS 118 to the software service layer 132 (and possibly extended to other layers or applications that present appropriate access credentials). The software service layer 132 may interact with a user set-up server 134 and a user set-up data store 136 to conduct a user set-up process for the UE 102.

It is understood that the system 100 may comprise any number of UEs 102, any number of cell sites 106, and any number of WiFi APs 112. The system may comprise a plurality of user set-up server 134/user set-up data store 136 pairs. For example, a first user set-up server 134 and a first user set-up data store 136 may be associated with a first enterprise; a second user set-up server 134 and a second user set-up data store 136 may be associated with a second enterprise; and a third user set-up server 134 and a third user set-up data store 136 may be associated with a third enterprise. A given pair of user set-up server 134 and user set-up data store 136 may be maintained, configured, and operated by a party separate from the wireless communication service provider. This party may be a corporation, an enterprise, a governmental department, a hospital, or other organization. In another case, however, at least one of the plurality of pairs of user set-up server 134 and user set-up data store 136 may be operated by a wireless communication service provider, for example to provide this robust UE user set-up process for small businesses, small organizations, and family shared subscription accounts who are not large enough to own and maintain their own user set-up server 134 and user set-up data store 136.

In an embodiment, the software service layer 132 monitors the progress of activation of the UE 102 by monitoring the actions taken by the activation application 120. When the UE 102 has reached the activation stage at which a normal network connection is established between the UE 102 and the network 108, via either the WiFi radio transceiver 110 or the cellular radio transceiver 104, the software service layer 132 may reach out to the wireless service provider network domain to obtain a source from which to obtain a user set-up package, for example an Internet Protocol (IP) address or a domain name of the user set-up server 134 associated with the UE 102 (associated to the UE 102 by virtue of the UE being a corporate phone for example). The software service layer 132 sends a user set-up package source request message comprising an identity of the UE 102, for example an MEID of the UE 102 or a mobile directory number (MDN) associated with the UE 102. The software service layer 132 may send this user set-up package source request message to the activation server 122 or another server (not shown) in the wireless communication service provider network domain. The appropriate source for the user set-up package for the UE 102, found based on the MEID or MDN of the UE, and returned to the software service layer 132.

The software service layer 132 sends a user set-up package request message to the user set-up server 134 that was identified by the response to its user set-up package source request message. The user set-up package request message identifies the UE 102, for example by providing the MEID of MDN. The user set-up server 134, in response to this request, obtains and returns a user set-up package that is differentiated for the specific UE 102 or for the specific category of UEs that the UE 102 belongs to (e.g., for a work group that the user of the UE 102 belongs to).

The user set-up package comprises UE configuration settings that are specific to the user of the UE 102 and/or specific to a group to which the user of the UE 102 belongs. In some cases, the user set-up package may further comprise mobile applications that are suitable for the user of the UE 102 or to the group the user of the UE 102 belongs, for example a specific work related application that is promoted by the user's employer to support the user in performing his or her job. The user set-up package may comprise a security certificate, a password, and/or a virtual private network (VPN) access code or security certificate into the memory 116. The user set-up package may comprise settings that activate parental controls on the UE 102, for example when the UE 102 is used by a dependent child or minor child of a family wireless subscription plan.

The user set-up package comprises one or more sets of instruction or scripts to be executed on the UE 102, possibly in the execution context of the software service layer 132, that configure the UE configuration settings provided in the user set-up package into the appropriate registers and locations in the memory 116 of the UE 102 and that installs any mobile applications that are included in the user set-up package.

The configuration of user settings may involve the software service layer 132 configuring functions embedded in the OS 118 or in basic applications of the UE 102. The configuration of user settings may involve the software service layer 132 configuring an email application, for example configuring a list of email addresses used by members of the same work group. The configuration of user settings may involve the software service layer 132 configuring a contacts list comprising contacts that are deemed desirable for members of the same work group. The configuration of user settings may involve the software service layer 132 configuring security settings on the UE 102, for example storing a security certificate and/or a password in the memory 116. The configuration of user settings may involve the software service layer 132 configuring a virtual private network (VPN) access code or security certificate into the memory 116. The installation of applications on the UE 102 by the software service layer 132 may involve the software service layer 132 installing application software into the memory 116 and configuring the installed application software with passwords and/or digital certificates.

Employing the user set-up process mediated by the software service layer 132 based on the user set-up package received from the user set-up server 134 can assure that user set-up of the UE 102, for example a UE used by a new employee of a major corporation, is performed correctly and consistently with the user set-up of other co-workers' devices. This automated process can promote the enterprise or corporation maintaining enhanced electronic security on the user set-up of the UE 102. For example, this automated process can obviate writing down user set-up instructions on paper that can be lost and leaked, can obviate sending an email or other electronic message containing user set-up instructions that can be accidently misaddressed or can be intercepted. The user set-up process mediated by the software service layer 132 can also support convenient update of user set-ups of UEs 102, for example by sending a message to the software service layer 132 to go through the user set-up process again or to perform a related user set-up update process. The user set-up update process may entail the software service layer 132 obtaining a user set-up update package from the user set-up server 134 which includes user set-up update instructions and updated user settings and/or applications.

Figure 2:
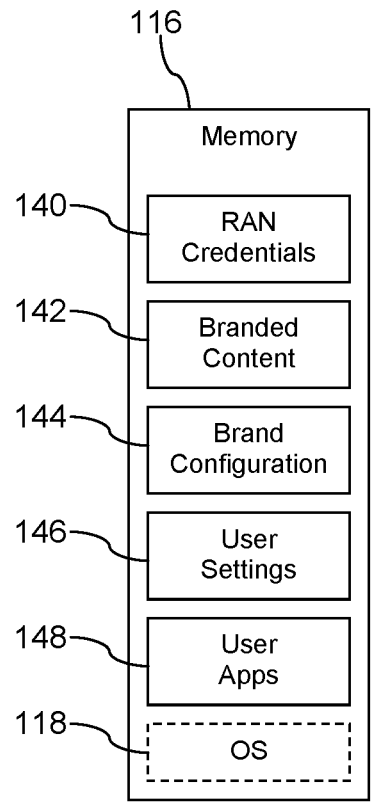
FIG. 2 is a block diagram of a memory configuration according to an embodiment of the disclosure.

Turning now to FIG. 2, the memory 116 is discussed further. As the activation application 120 performs its function, RAN credentials 140 are obtained from the activation server 122 and stored in the non-volatile portion of the memory 116. As the branding application 126 executes, it retrieves branded content 142 and brand configuration 144 from the branding server 128 and stores in the non-volatile portion of the memory 116. As the software service layer 132 performs use set-up based on the user set-up package received from the user set-up server 134, it stores user settings 146 and user applications 148 in the non-volatile portion of the memory 116.

Figure 3:
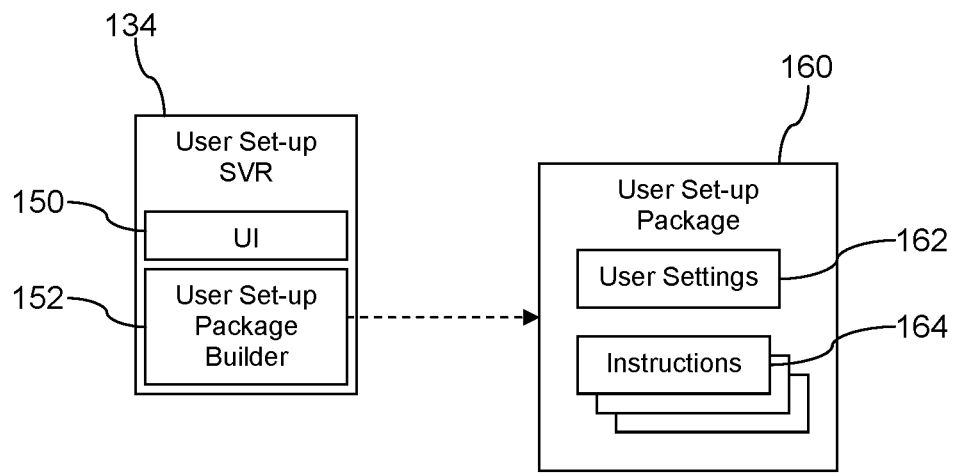
FIG. 3 is a block diagram of a user settings server according to an embodiment of the disclosure.

Turning now to FIG. 3, the user set-up server 134 is described. In an embodiment, the user set-up server 134 comprises a user interface 150 and a user set-up package builder application 152. A craftsperson, such as an information technology (IT) worker at an enterprise, can employ the user interface 150 to configure rules or profiles for the user set-up package builder application to build a user set-up package 160. For example, the user interface 150 may allow defining a single rule or profile for an entire enterprise, for a department of an enterprise, for a work group of an enterprise, or a specific individual employee of the enterprise. The user interface 150 may prompt the craftsperson to enter an identity or present a list of available identities to select. The user interface 150 may then prompt the craftsperson to define the various artifacts of the user set-up package 160 to be associated to that identity. The craftsperson may identify applications that are to be part of the user set-up package 160 (e.g., applications that are to be installed by the software service layer 132 on the UE 102 when processing the user set-up package 160). The applications to be configured on the UE 102 may be considered to be part of the user settings 162 or configurations. The craftsperson may identify user settings 162 or configurations that are to be part of the user set-up, such as settings of email preconfigured email addresses, settings of predefined contact information, predefined security codes and access privileges.

In an embodiment, when the software service layer 132 requests the user set-up package 160, the user set-up package builder application 152 looks up the predefined rule or profile associated with this user (e.g., the identity of a department, work group, or other category) and executes the rules to automatically build the user set-up package 160. Some of the automated processing may entail completing a registration process for a third party application to be included in the package 160 with the third party application developer. The third party application may be software which is leased or otherwise made available on a per-installation fee basis or on a different fee basis. This registration process may generate a security credential or application password, unique to this specific UE 102 and not the same across the category or work group that the UE 102 is associated with, that the user set-up package builder application 152 builds into the user set-up package 160 for use by the software service layer 132, while executing instructions 164, when installing the subject third party application on the UE 102. The user set-up package builder application 152 further places instructions 164 in the user set-up package 160. When the user set-up package builder application 152 has completed building the user set-up package 160 it may return it, in real-time, to the software service layer 132 which requested it.

It is understood that in some cases the user set-up package builder 152 may build one or more user set-up packages 160 in advance of receiving the request for the package 160 from the software service layer 132. Such pre-built packages 160 may still incorporate unique user passwords and security certificates.

Figure 4A:
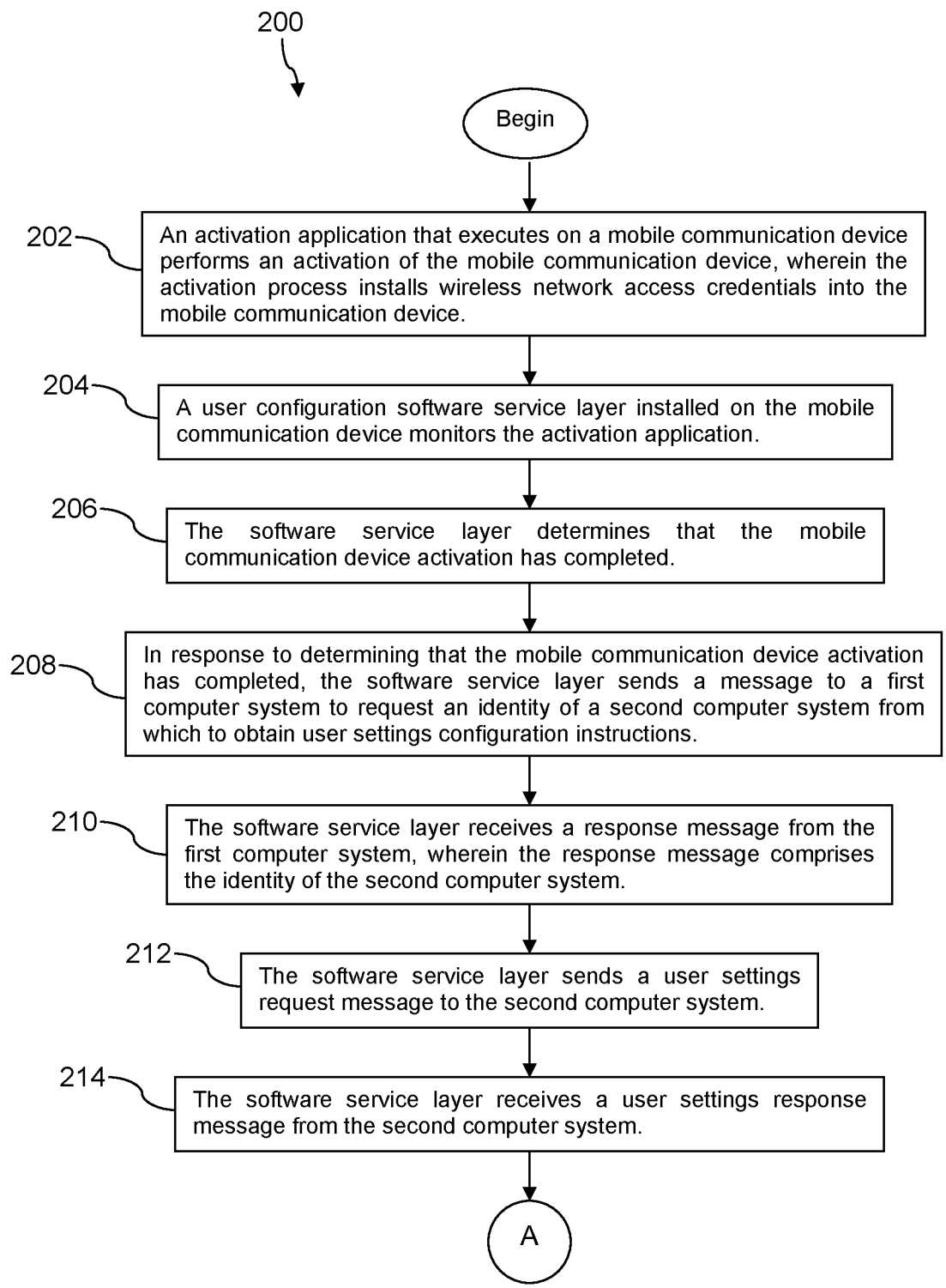
FIG. 4A and FIG. 4B are a flow chart of a method according to an embodiment of the disclosure.
Figure 4B:
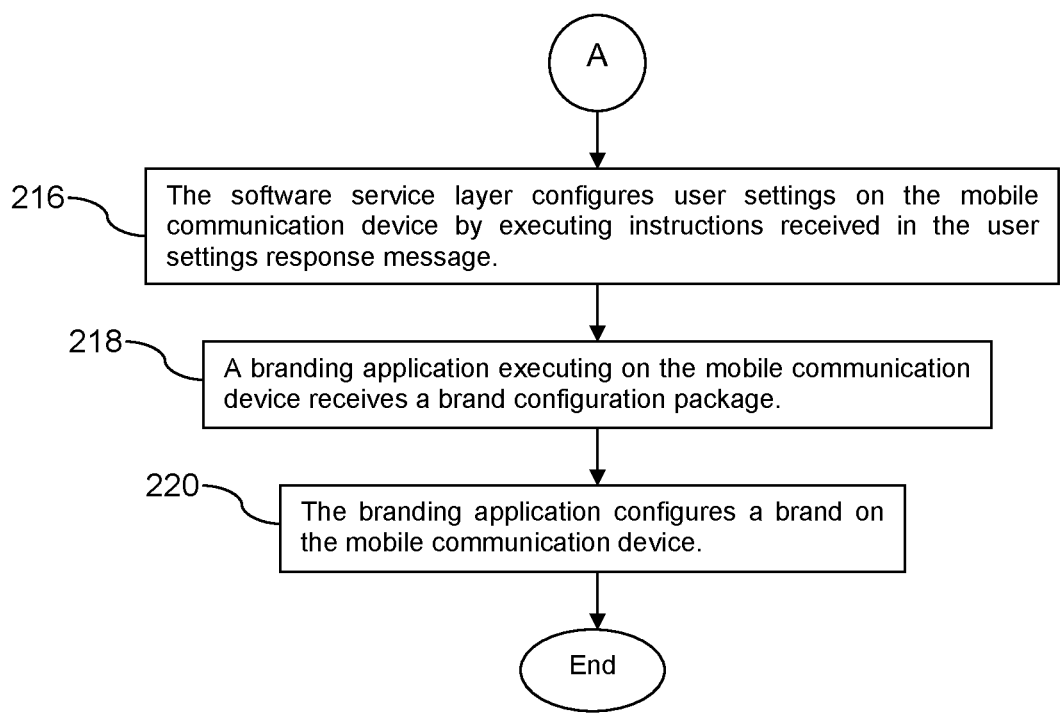

Turning now to FIG. 4A and FIG. 4B, a method 200 is described. At block 202, an activation application that executes on a mobile communication device performs an activation of the mobile communication device, wherein the activation process installs wireless network access credentials into the mobile communication device. At block 204, a user configuration software service layer installed on the mobile communication device monitors the activation application. At block 206, the software service layer determines that the mobile communication device activation has completed. At block 208, in response to determining that the mobile communication device activation has completed, the software service layer sends a message to a first computer system to request an identity of a second computer system from which to obtain user settings configuration instructions.

At block 210, the software service layer receives a response message from the first computer system, wherein the response message comprises the identity of the second computer system. At block 212, the software service layer sends a user settings request message to the second computer system. At block 214, the software service layer receives a user settings instruction response message from the second computer system.

At block 216, the software service layer configures user settings on the mobile communication device by executing instructions received in the user settings instruction response message. At block 218, a branding application executing on the mobile communication device receives a brand configuration package. The brand configuration package may contain various branding information. The brand configuration package may comprise a power-on animation, a power-off animation, wallpaper, a ringtone, a link to an application store, a short code of a customer care center, a short code of voice mail, or a combination thereof. At block 220, the branding application configures a brand on the mobile communication device. Configuration of the brand by the branding application transforms the device from an unbranded, generic device to a branded device. Branding may comprise storing brand information into non-volatile portions of memory 116 by the branding application such that the UE can read this brand information from the memory 116 to make the phone conform to the brand. Such banding information may comprise power-on animations, power-off animations, wallpaper, a ringtone, a link to an application store, a short code or phone number of customer care center, a short code or phone number of voice mail, and/or one or more applications.

Figure 5:
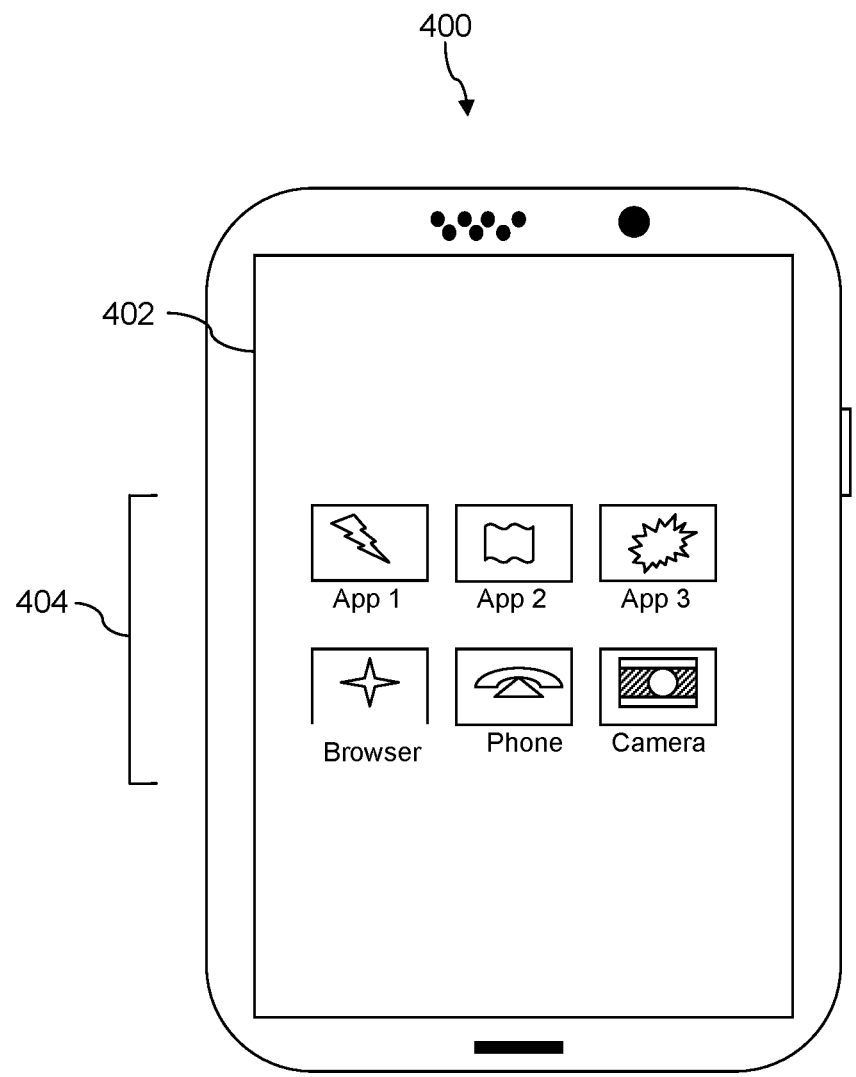
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
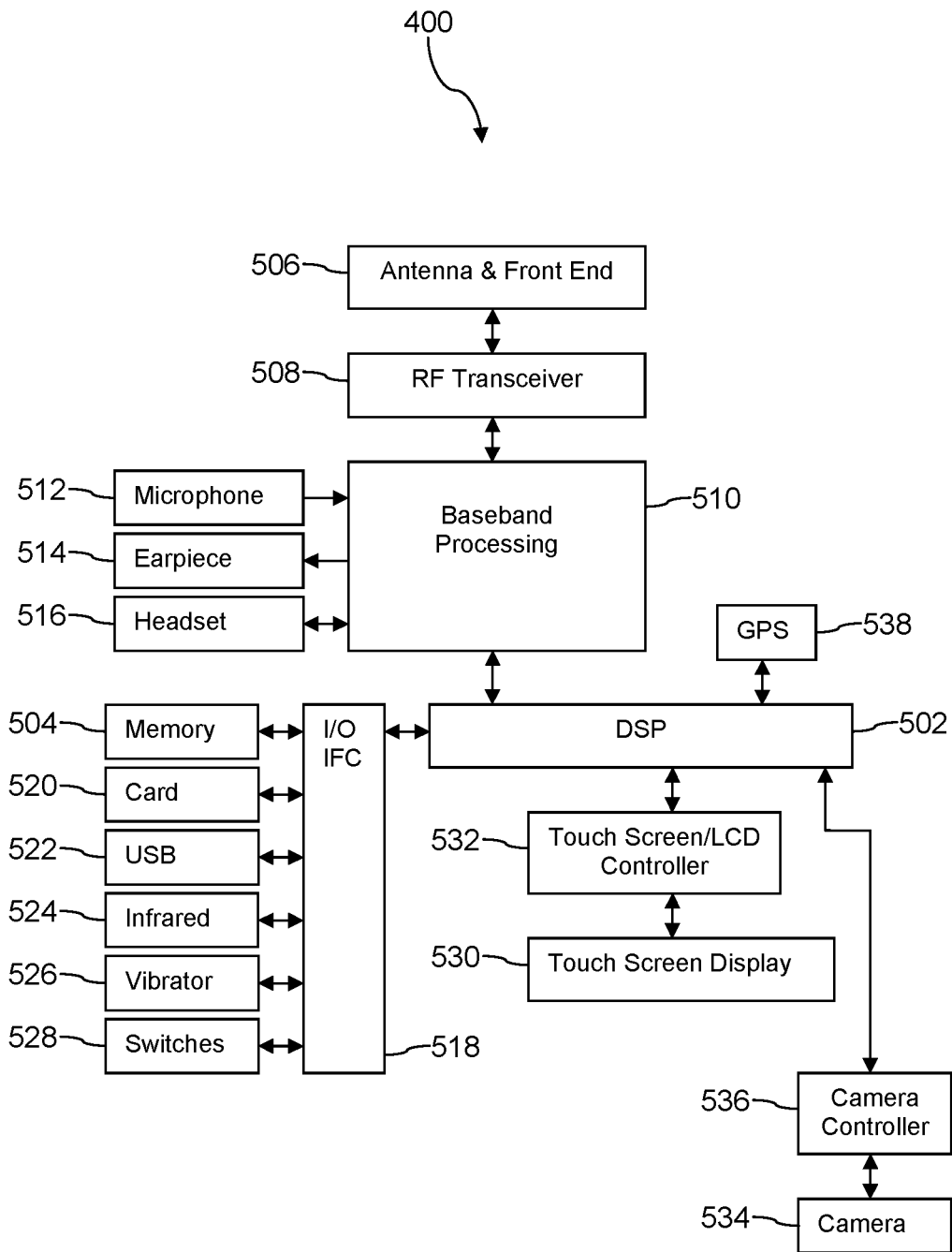
FIG. 6 is a block diagram of a hardware architecture of a user equipment according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
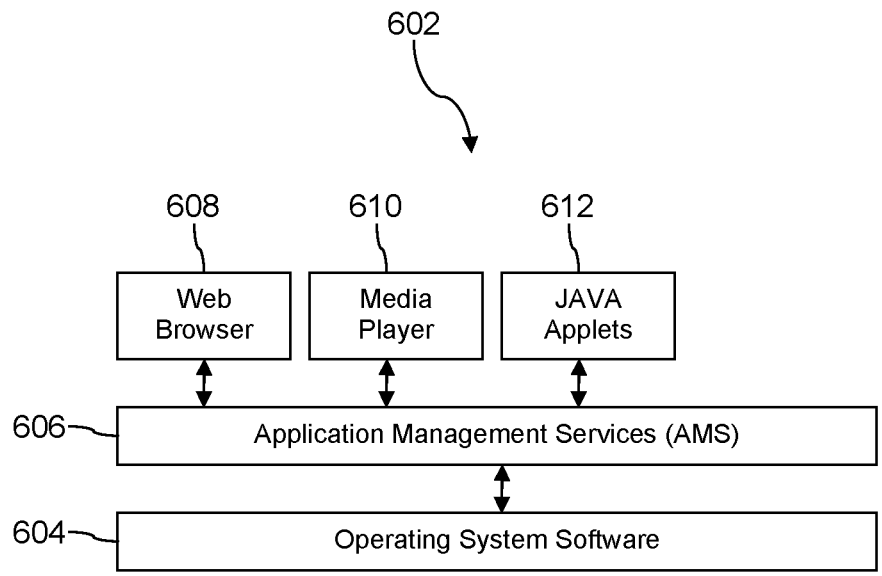
FIG. 7A is a block diagram of a software architecture of a user equipment according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
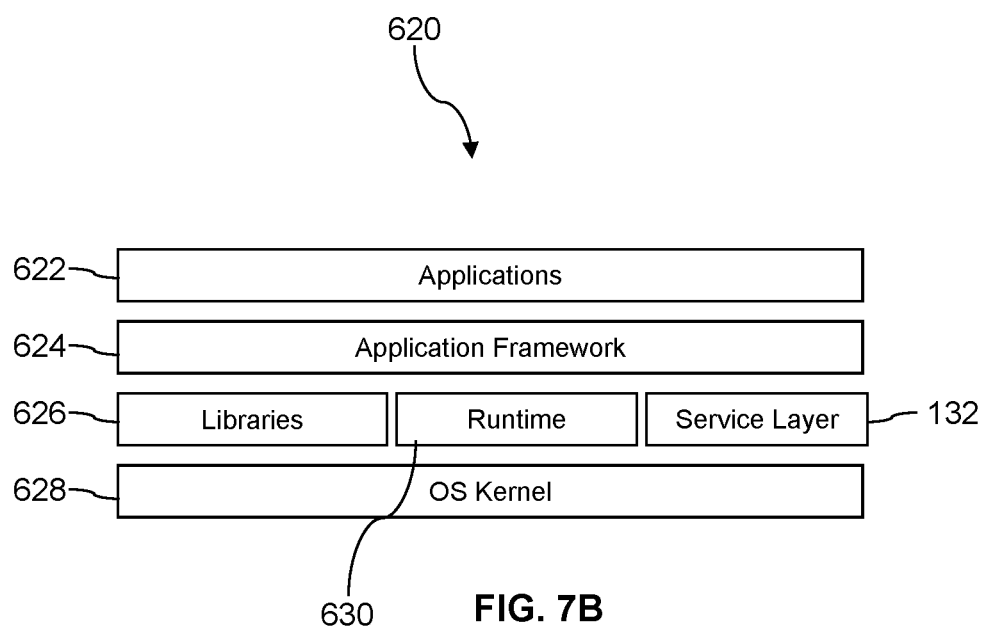
FIG. 7B is a block diagram of another software architecture of a user equipment according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
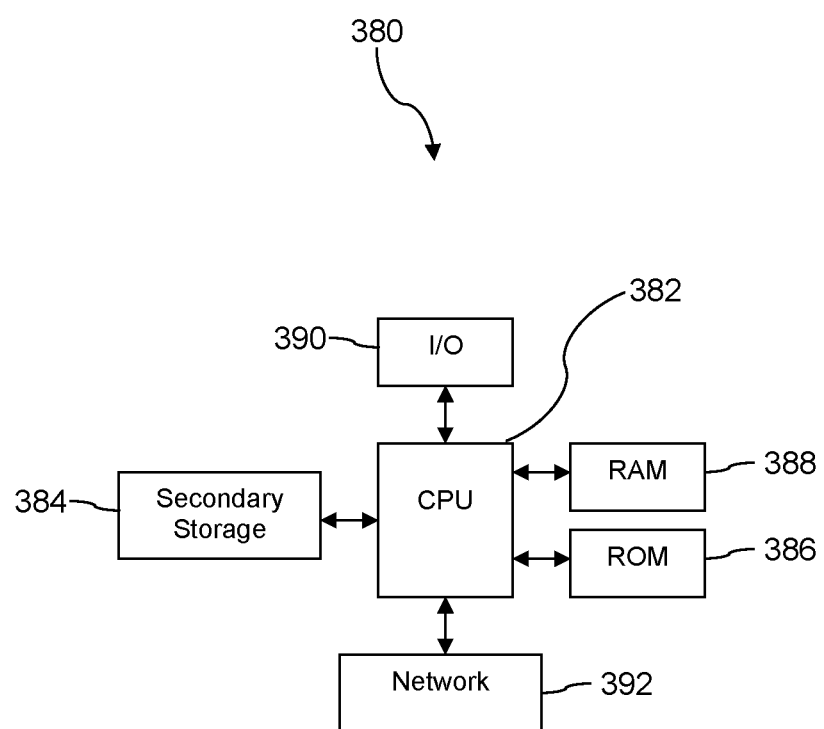
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
   a mobile communication device that comprises a user configuration software service layer configured to:
      request an identity of an enterprise computer associated with an enterprise in response to determining that activation of the mobile communication device has completed,
      receives the identity of the enterprise computer from a wireless communication service provider computer associated with a wireless communication service provider, and
      transmits a user settings request message to the enterprise computer based on the received identity of the enterprise computer, and
   the enterprise computer comprising:
      a non-transitory memory;
      a processor; and
      a user set-up package builder application stored in the non-transitory memory that, when executed by the processor:
         receives inputs from a user interface of the package builder application, where the inputs define a plurality of rules for associating a plurality of user settings to users based on a group membership of each of the users,
         receives the user settings request message from the user configuration software service layer executing on the mobile communication device, where the user settings request message comprises an identity of the mobile communication device,
         in response to receiving the user settings request message, determines a group membership of the mobile communication device based on the identity of the mobile communication device and identifies one or more rules of the plurality of rules corresponding to the determined group membership,
         based on the identified one or more rules, completes a registration process for use of a third party mobile application,
         based on the determined group membership of the mobile communication device, the identified one or more rules, and the completed registration process, creates a package comprising user settings, a file associated with the third party mobile application for installing on the mobile communication device, and instructions to be executed by the mobile communication device to configure itself according to the user settings, and
         sends the package comprising the user settings, the file associated with the third party mobile application, and the instructions to be executed by the mobile communication device to the mobile communication device, wherein the mobile communication device configures itself with the user settings by executing the instructions.

2. The system of claim 1, wherein the user set-up package builder application generates a unique password for the mobile communication device, and wherein the unique password is one of the user settings in the package.

3. The system of claim 1, wherein the user settings comprise at least one of an email address list, a contact list, a security certificate for accessing a virtual private network (VPN) resource, or an enterprise password.

4. The system of claim 1, wherein the identity of the enterprise computer comprises a Uniform Resource Locator (URL), an Internet Protocol (IP) address, or domain name of the enterprise computer.

5. The system of claim 4, wherein the user configuration software service layer transmits the user settings request message to the URL, the IP address, or the domain name of the enterprise computer.

6. The system of claim 1, wherein the user settings comprise enterprise applications and a contacts list associated with the enterprise.

7. The system of claim 1, wherein the third party mobile application is registered for fee based use to the enterprise.

8. The system of claim 1, wherein the user configuration software service layer is a component of an operating system of the mobile communication device.

9. The system of claim 1, wherein the mobile communication device comprises a mobile phone, a smart phone, a personal digital assistant (PDA), a media player, a wearable computer, a headset computer, a laptop computer, a tablet computer, or a notebook computer.

10. The system of claim 1, wherein the user set-up package builder application further:
    receives additional inputs from the user interface of the package builder application, where the additional inputs define one or more rules for associating a plurality of user settings to a second user,
    receives a second user settings request message from a user configuration software service layer executing on a second mobile communication device, where the second request message comprises an identity of the second mobile communication device,
    based on the one or more rules for associating user settings to the second user, creates a second package comprising corresponding user settings and corresponding instructions to be executed by the second mobile communication device to configure itself according to the corresponding user settings, and
    sends the second package comprising the corresponding user settings and the corresponding instructions to be executed by the second mobile communication device to the second mobile communication device, wherein the second mobile communication device configures itself with the corresponding user settings by executing the corresponding instructions.

11. The system of claim 10, wherein the user settings in the second package comprise at least one of an email address list, a contact list, a security certificate for accessing a virtual private network (VPN) resource, or an enterprise password.

12. The system of claim 10, wherein the user settings in the second package comprise enterprise applications and a contacts list associated with the enterprise.

13. The system of claim 10, wherein the second package comprises a mobile application, and wherein the mobile application is a third party application that is registered for fee based use to one of an enterprise or a corporation.

14. The system of claim 10, wherein the user set-up package builder application generates a unique password for the second mobile communication device, and wherein the unique password is one of the corresponding user settings in the second package.

\* \* \* \* \*